United States Patent [19]

Heismann

[11] Patent Number: 5,361,270
[45] Date of Patent: Nov. 1, 1994

[54] APPARATUS AND METHOD EMPLOYING POLARIZATION MODULATION TO REDUCE EFFECTS OF POLARIZATION HOLE BURNING AND/OR POLARIZATION DEPENDENT LOSS

[75] Inventor: Fred L. Heismann, Freehold, N.J.

[73] Assignee: AT&T Bell Laboratories, Murray Hill, N.J.

[21] Appl. No.: 107,872

[22] Filed: Aug. 18, 1993

[51] Int. Cl.$^5$ .......................... H01S 3/10; G02B 6/12; G02B 5/30

[52] U.S. Cl. ...................................... 372/27; 385/11; 385/14

[58] Field of Search .................... 385/11, 14; 372/27, 372/33, 105, 106; 359/181, 192

[56] References Cited

U.S. PATENT DOCUMENTS

| | | | |
|---|---|---|---|
| 4,923,290 | 5/1990 | Brinkmeyer et al. | 385/11 |
| 4,932,783 | 6/1990 | Kersey et al. | 356/345 |
| 5,206,924 | 4/1993 | Kersey | 385/24 |
| 5,212,743 | 5/1993 | Heismann | 385/11 |

OTHER PUBLICATIONS

IEEE Journal of Quantum Electronics, vol. QE-19, No. 11, pp. 1704–1717, Nov., 1983, "Spectral and Polarization Hole Burning in Neodymium Glass Lasers" by Douglas W. Hall, et al.

Journal of Lightwave Technology, vol. 6, No. 6, (ISSN 0733–8724), pp. 838–845, Jun. 1990, "Analysis of Input-Polarization-Induced Phase Noise in Interferometric Fiber-Optic Sensors and Its Reduction using Polarization Scrambling" by Alan D. Kersey, et al.

Journal of Lightwave Technology, vol. 6, No. 10, (ISSN 0733–8724), pp. 1599–1609, Oct., 1988, "Optimization and Stabilization of Visibility in Interferometric Fiber-Optic Sensors Using Input-Polarization Control" by A. D. Kersey, et al.

Electronics Letters, vol. 23, No. 12, pp. 634–636, Jun. 4, 1987, "Monomode Fibre Polarisation Scrambler" by A. D. Kersey, et al.

Electronics Letters, vol. 23, No. 10, pp. 513–514, May 7, 1987, "Polarisation-Insensitive Heterodyne Detection Using Polarisation Scrambling" by T. G. Hodgkinson, et al.

Optics Letters, vol. 16, No. 6, Mar. 15, 1991, pp. 381–383, "Depolarized source for fiber-optic applications" by W. K. Burns, et al.

Conference on Optical Fiber Communication/International Conference on Integrated Optics and Optical Fiber Communication, OFC '93/IOOC '93, San Jose, Calif., Feb. 21–26, 1993, Post-Deadline Paper (PD5-1,) "Observation of new polarisation dependence effect in long haul optically amplified system" by M. G. Taylor.

*Primary Examiner*—Rodney B. Bovernick
*Assistant Examiner*—Robert McNutt
*Attorney, Agent, or Firm*—Thomas Stafford

[57] ABSTRACT

The effects of polarization dependent hole burning and/or polarization dependent loss are reduced by modulating the state of polarization (SOP) of an arbitrarily polarized optical signal being launched into the transmission path periodically through a predetermined sequence of polarization states. The sequence of polarization states is selected such that on average the launched modulated signal excites substantially all possible polarization states with substantially equal probability, independent of the input SOP to the polarization modulator. In one exemplary embodiment, the SOP is modulated by a combination cascade of a rotating half-wave plate followed by a quarter-wave plate, which rotates at a different angular speed. In another exemplary embodiment, the SOP is modulated by a combination cascade of two variable phase retarders oriented at fixed angles of 0° and 45°, where the modulation frequencies of the two retarders are substantially different from each other.

34 Claims, 2 Drawing Sheets

APPARATUS AND METHOD EMPLOYING POLARIZATION MODULATION TO REDUCE EFFECTS OF POLARIZATION HOLE BURNING AND/OR POLARIZATION DEPENDENT LOSS

CROSS-REFERENCE TO RELATED APPLICATIONS

U.S. patent applications Ser. No. 08/079,432 and Ser. No. 08/079,437 were filed on Jun. 18, 1993.

TECHNICAL FIELD

This invention relates to the optical transmission of information and, more particularly, to improving transmission capabilities over long-distance optical transmission paths employing repeaters.

BACKGROUND OF THE INVENTION

Very long optical fiber transmission paths, such as those employed in undersea or trans-continental terrestrial lightwave transmission systems including optical-amplifier repeaters, are subject to decreased performance caused by a host of possible impairments. The impairments typically increase as a function of the length of the optical transmission. In long optical transmission paths that include optical amplifiers, the impairments tend to vary with time and cause a random fluctuation in the signal-to-noise ratio (SNR) of the optical transmission path. The random fluctuation in SNR contributes to a phenomenon known as signal fading. The SNR fluctuations also result in an increased average bit error ratio (BER) in digital signals being transmitted over the optical transmission path. When the SNR of a digital signal being transported on such an optical transmission path becomes unacceptably small relative to the average SNR (resulting in an undesirably high BER), a signal-to-noise fade is said to have occurred. Experimental evidence has shown that the signal fading and SNR fluctuations are caused by a number of polarization dependent effects induced by the optical fiber itself and/or other optical components within the transmission path. In particular, one of these effects has now been identified as polarization dependent hole burning (PDHB), which is related to the population inversion dynamics of the optical amplifiers. A discussion of hole-burning can be found in an article by D. W. Douglas, R. A. Haas, W. F. Krupke and M. J. Weber, entitled "Spectral and Polarization Hole Burning in Neodymium Glass Lasers"; *IEEE Journal of Quantum Electronics*, Vol. QE-19, No. 11, November 1983.

PDHB reduces gain of the optical amplifiers within the long optical transmission path for any signal having a state of polarization ("SOP") parallel to that of a polarized primary optical signal carried by the transmission path. However, the gain provided by these amplifiers for optical signals which have an SOP orthogonal to that of the primary signal remains relatively unaffected. The polarized primary signal reduces the level of population inversion anisotropically within the amplifier. This in turn, produces an isotropic saturation of the amplifier, which results in a lower gain for optical signals in that SOP. This effectively causes the amplifier to preferentially enhance noise having an SOP orthogonal to that of the primary signal. This enhanced noise lowers the SNR of the transmitted information and causes an increased BER.

A prior method for reducing signal fading employs a two-wavelength light source to transmit information in two orthogonal states of polarization over an optical fiber transmission path. Since this quasi-non-polarized light source shares its optical power equally on any two orthogonal SOPs within the fiber, deleterious polarization-dependent effects may be reduced as long as the two wavelengths remain orthogonally polarized along the optical transmission path. Other methods employ polarization modulators between the optical signal source and the optical transmission path to periodically modulate the polarization state of the primary optical information signal through a predetermined sequence of polarization states such that, when averaged over the saturation time of the amplifier, all possible polarization states are excited with equal probability. These methods generally employ single-stage polarization transformers that modulate the output SOP such that it traces periodically an arbitrary but fixed great circle on the Poincaré sphere. These modulators, however, require that the optical signal launched into the polarization modulator be in a stable and well-defined polarization state.

SUMMARY OF THE INVENTION

The problems relating to polarization dependent hole burning and/or polarization dependent loss are overcome, in accordance with the principles of the invention, by modulating the state of polarization (SOP) of an optical signal being launched into the transmission path periodically through a predetermined sequence of polarization states. These time-varying polarization states are generated by a combination of at least two polarization modulators, which are operated at substantially different modulation frequencies. For any given arbitrary input SOP to the modulators, the corresponding sequence of polarization states is selected such that averaged over the longest modulation period, substantially all possible output polarization states are excited with substantially equal probability. This condition is fulfilled if, averaged over a full modulation sequence, the three Stokes parameters of the modulated polarization output states $s_1$, $s_2$, and $s_3$ are zero (0). Preferably, the longest modulation period is substantially shorter than the anisotropic saturation time of the optical amplifier, which is typically of the order of 1 msec. The polarization modulation is realized by employing two cascaded polarization modulators, each of which produces a substantially different sequence of polarization states for the same input polarization state than the other. The modulation sequences of the two polarization modulators are selected such that the time-averaged Stokes parameters $s_1$, $s_2$, and $s_3$ of the modulated output polarization of the entire modulator cascade vanish for any arbitrary input polarization state to the modulators. Hence, the input SOP to the modulator can be arbitrary and can even slowly vary with time.

In one exemplary embodiment of the invention, the modulator comprises two cascaded rotating wave plates: a half-wave plate, spinning at a first constant angular velocity, followed by a quarter-wave plate spinning at a second angular velocity different from the first.

In another exemplary embodiment, the modulator comprises a cascade of two adjustable phase retarders oriented at a fixed relative angle of 45°, and both of which modulate the input optical signal to produce a periodic phase shift between $-\pi$ and $+\pi$.

Additionally, for applications in which it is desirable to reduce effects of polarization dependent loss, the SOP modulation frequencies are selected to be a multiple of the information signal clock.

DETAILED DESCRIPTION

Figure 1:
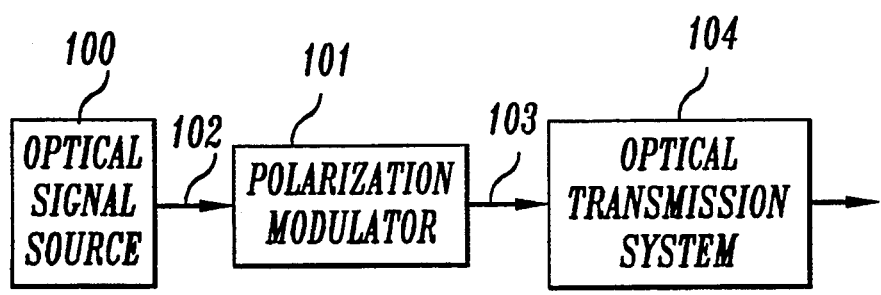
FIG. 1 is a simplified block diagram of an arrangement including a polarization modulator which facilitates the practice of the invention.

FIG. 1 shows a simplified block diagram of an exemplary arrangement facilitating the practice of the invention. As shown, the invention includes optical signal source 100 which produces an optical information signal 102, polarization modulator 101 which modulates the SOP of optical information signal 102 to produce modulated optical information signal 103, and optical transmission system 104, into which the modulated optical information signal 103 is launched. Optical information signal 102 is produced, in well known fashion, by a laser transmitter (not shown) in optical signal source 100.

Figure 2:
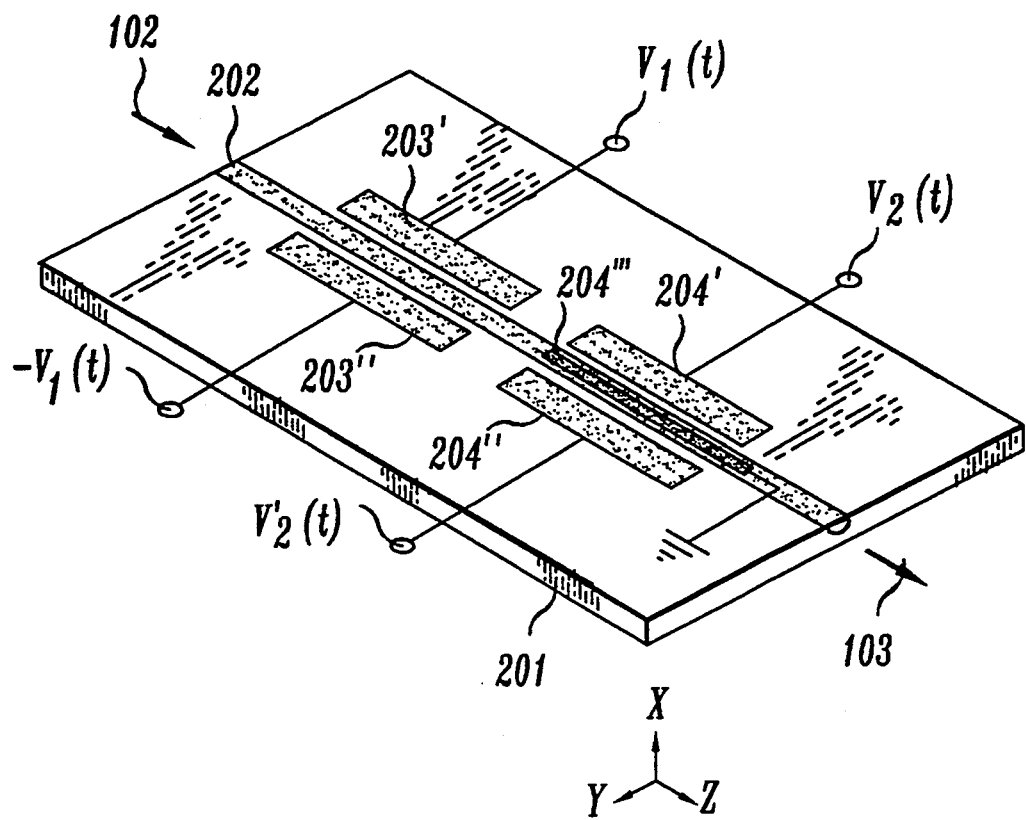
FIG. 2 shows a view of the waveguide and electrode structure of one arrangement which may be employed for the polarization modulator of FIG. 1.

FIG. 2 shows one embodiment of polarization modulator 101 which may be advantageously used in practicing the invention. An integrated optic realization of polarization modulator 101 is fabricated on low-birefringence X-cut, Z-propagating LiNbO$_3$ substrate 201 and operates with a standard titanium-indiffused, single mode waveguide 202. It includes two electrode sections comprised of electrodes 203' and 203'', and 204' and 204'', respectively, disposed on substrate 201 on both sides of waveguide 202 and one common ground electrode 204''' on top of waveguide 202.

The first section of modulator 101, including electrodes 203' and 203'', operates to retard the linear polarization component of the incoming optical signal 102 parallel to the X axis (TM mode) relative to the polarization component of the incoming optical signal parallel to the Y axis (TE mode). The TE-TM mode phase shift is induced via the $r_{22}$ and $r_{12}$ ($r_{22} = -r_{12} = 3.4 \cdot 10^{-12}$ m/V) electro-optic coefficients by applying balanced drive voltage components $V_1(t)$ and $-V_1(t)$ to electrodes 203' and 203'', respectively, thereby inducing an electric field $E_y$ in waveguide 202. The total induced phase shift $\Phi(t)$ between the X and Y polarized components is $$\phi(t) = \Gamma(r_{12} - r_{22}) \frac{2\pi}{\lambda} \cdot \frac{V_1(t)}{G} \cdot L\, n_0^3 \quad (1)$$

where t is time, $\lambda$ is the free-space wavelength, G is the gap between electrodes 203' and 203', L is the length of electrodes 203' and 203'', $n_0$ is the ordinary index of refraction and $\Gamma$ is a normalized overlap parameter between the optical and electrical fields ($0 \leq \Gamma \leq 1$).

The second electrode section of modulator 101, including electrodes 204' and 204'', operates to retard the linear polarization component having an angle of 45° with respect to the X and Y axes relative to the linear polarization component having an angle of −45° with respect to the X and Y axes (TE-TM mode conversion). TE-TM mode conversion is accomplished via the $r_{61}(r_{61} = -r_{22})$ electro-optic coefficient by applying common drive voltages $V_2(t)$ and $V'_2(t) = V_2(t)$ to the side electrodes 204' and 204'', thereby inducing an electric field $E_x$ in the waveguide 202. The phase retardation $\eta(t)$ for mode conversion induced in an electrode section of length L is $$\eta(t) = \Gamma\, r_{61} \frac{2\pi}{\lambda} \cdot \frac{V_2(t)}{G'} \cdot L n_0^3 \quad (2)$$

where t is time, $\lambda$ is the free-space wavelength, G' is the gap between the ground electrode 204''' and the side electrodes 204' and 204'', L is the length of electrodes 204', 204'' and 204''', $n_0$ is the ordinary index of refraction and $\Gamma$ is the spatial overlap of the applied electric field $E_x$ with the optic fields ($0 \leq \Gamma \leq 1$).

The polarization transformation of modulator 101 shown in FIG. 2 can be described by a 3×3 Mueller matrix $\underline{M}$, which relates the Stokes parameters $s_1$, $s_2$, and $s_3$ of the arbitrary polarization state of optical information signal 102 to the Stokes parameters of the modulated information signal 103. The transformation of the first electrode section 203 is described by the matrix $$M_1 = \begin{bmatrix} 1 & 0 & 0 \\ 0 & \cos2\phi(t) & -\sin2\phi(t) \\ 0 & -\sin2\phi(t) & \cos2\phi(t) \end{bmatrix}, \quad (3)$$

and that of the second section by the matrix $$M_2 = \begin{bmatrix} \cos2\eta(t) & 0 & \sin2\eta(t) \\ 0 & 1 & 0 \\ -\sin2\eta(t) & 0 & \cos2\eta(t) \end{bmatrix} \quad (4)$$

Hence, the overall transformation of polarization modulator 101 is given by $$M = M_2 \cdot M_1 = \begin{bmatrix} \cos2\eta(t) & -\sin2\phi(t)\sin2\eta(t) & \cos2\phi(t)\sin2\eta(t) \\ 0 & \cos2\phi(t) & -\sin2\phi(t) \\ -\sin2\eta(t) & -\sin2\phi(t)\cos2\eta(t) & \cos2\phi(t)\cos2\eta(t) \end{bmatrix} \quad (5)$$

For an arbitrarily polarized information signal 102, the time averaged values of the Stokes parameter $s_1$, $s_2$, and $s_3$ of the modulated optical information signal 103 vanish if the time averaged values of all nine elements of the matrix $\underline{M}$ are equal to zero. This is the case when the two electrode sections are driven by voltages $$V_1(t) = V_{90} \cdot T(\Omega_1 t), \quad (6)$$

$$V_2(t) = V_0 \cdot T(\Omega_2 t) + V_T, \quad (7)$$

$$V'_2(t) = V_0 \cdot T(\Omega_2 t) - V_T, \quad (8)$$

where $V_0$ is the voltage that induces complete TE-TM mode conversation ($\eta = \pi$), $V_{90}$ is the voltage that induces a TE-TM phase shift of $\pi(\phi = \pi)$, and $V_T$ is the voltage that reduces the residual, static birefringence in waveguide 202 substantially to zero (0). The symmetric sawtooth function T is given, for example, by $$T(\Omega t) = (-1)^n 2(\Omega t/\pi - n) \text{ for } 2n - 1 \leq 2\Omega t/\pi \leq 2n + 1, \quad (9)$$

where $\Omega_1$ and $\Omega_2$ are the two modulation frequencies ($\Omega_1 \neq \Omega_2$), t is the time, and n is an arbitrary integer. Preferably, the two modulation frequencies are chosen such that $\Omega_1 = 2\Omega_2$ or $\Omega_2 = 2\Omega_1$ and $\Omega_i$, i=1, 2, substantially larger than $2\pi/t_s$, where $t_s$ is the anisotropical saturation time of the optical amplifier (typically 1 ms). Then all nine elements of the matrix $\underline{M}$ vanish if averaged over a full period of the lower of the two modulation frequencies. To reduce the effects of polarization dependent loss in the optical transmission system 104 (FIG. 1), the modulation frequencies $\Omega_1$ and $\Omega_2$ are chosen to be integer multiples of the clock frequency of optical information signal 102.

If desired, sinusoidal drive voltages could be employed to provide the modulation, namely, $$V_1(t) = 0.7655 V_\pi \sin(\Omega_1 t), \tag{10}$$

$$V_2(t) = 0.7655 V_0 \sin(\Omega_2 t) + V_T, \tag{11}$$

$$V'_2(t) = 0.7655 V_0 \sin(\Omega_2 t) - V_T. \tag{12}$$

Figure 3:
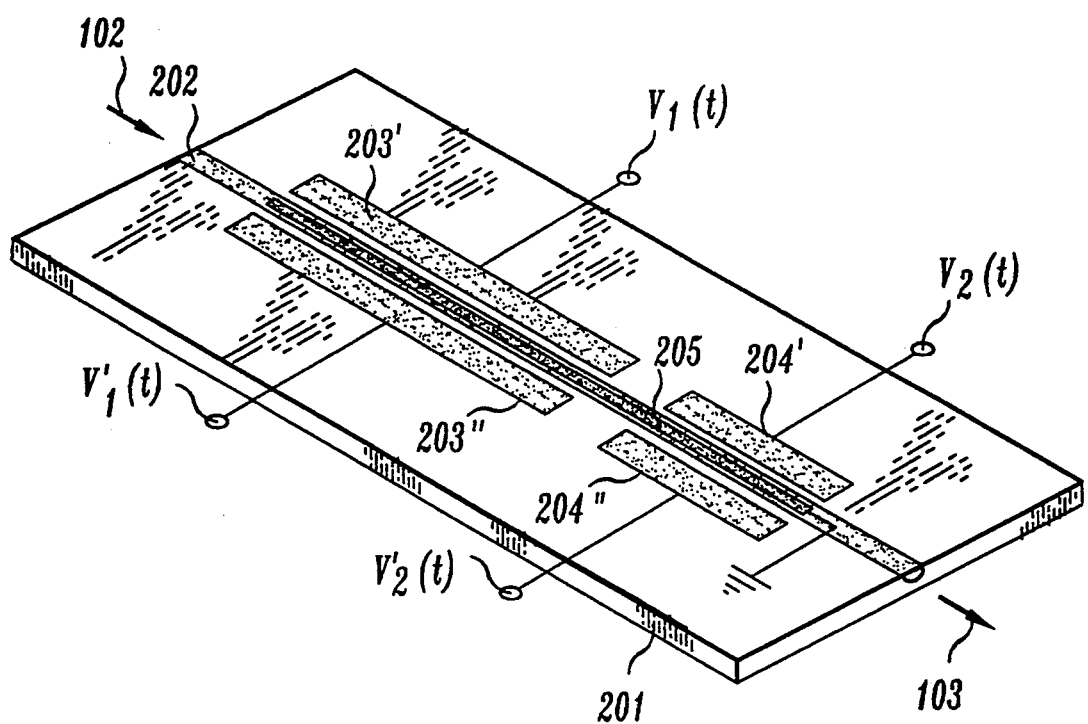
FIG. 3 shows a view of still another waveguide and electrode structure which can be utilized for the polarization modulator of FIG. 1.

FIG. 3 shows another embodiment of polarization modulator 101 which also may be employed in practicing the invention. Again, an integrated optic realization of polarization modulator 101 is fabricated on low-birefringence X-cut, Z-propagating LiNbO$_3$ substrate 201 and operates with a standard titanium-indiffused, single mode waveguide 202. It includes two electrode sections comprised of electrodes 203' and 203", and 204' and 204", respectively, disposed on both sides of waveguide 202, and one common ground electrode 205 on the top of waveguide 202. In this embodiment of modulator 101, the first electrode section (203' and 203") operates in a similar fashion to an endlessly rotating half-wave plate, i.e., it generates a constant phase retardation of $\pi$ at a variable angular orientation. This is achieved by inducing a variable combination of TE-TM phase shifting and TE-TM mode conversion. The second electrode section (204' and 204") operates in similar fashion to an endlessly rotating quarter-wave plate, generating a constant phase retardation $\pi/2$ at a variable angular orientation. TE-TM mode conversion and TE-TM phase shifting are induced in a similar way as in the embodiment of modulator 101 shown in FIG. 2 by applying drive voltages $V_1(t)$ and $V_2(t)$ to side electrodes 203', 203", 204' and 204".

The drive voltage $V_1(t)$ and $V'_2(t)$ applied to electrodes 203' and 203", respectively, are $$V_1(t) = V_0 \sin(\Omega_1 t) + V_\pi \cos(\Omega_1 t) + V_T, \tag{13}$$

$$V'_1(t) = V_0 \sin(\Omega_1 t) - V_\pi \cos(\Omega_1 t) - V_T, \tag{14}$$

where $V_0$ is again the voltage that induces complete TE-TM mode conversion ($\eta = \pi$), $V_\pi$ is the voltage that induces a TE-TM phase shift of $\pi(\phi = \pi)$, and $V_T$ is the voltage that reduces the residual, static birefringence in waveguide 202 substantially to zero (0).

When driven by these drive voltages $V_1(t)$ and $V'_1(t)$, the first section (203' and 203") of polarization modulator 101 acts like a rotating half-wave plate spinning at a constant angular velocity of $\Omega_1$.

The drive voltages applied to electrodes 204' and 204", respectively, are $$V_2(t) = (V_0/2) \sin(\Omega_2 t) + (V_\pi/2) \cos(\Omega_2 t) + V_T, \tag{15}$$

$$V'_2(t) = (V_0/2) \sin(\Omega_2 t) - (V_\pi/2) \cos(\Omega_2 t) - V_T, \tag{16}$$

where $V_0$, $V_\pi$ and $V_T$ are as above in equations (13) and (14).

When driven with these voltages $V_2(t)$ and $V'_2(t)$, the second section of modulator 101 acts like a rotating quarter-wave plate spinning at a constant angular velocity $\Omega_2$.

The polarization transformation produced by the spinning half-wave plate is described by the Mueller matrix $$M_3 = \begin{bmatrix} \cos(2\Omega_1 t) & \sin(2\Omega_1 t) & 0 \\ \sin(2\Omega_1 t) & -\cos(2\Omega_1 t) & 0 \\ 0 & 0 & -1 \end{bmatrix}, \tag{17}$$

and that produced by the spinning quarter-wave plate is given by $$M_4 = \frac{1}{2} \begin{bmatrix} 1 + \cos(2\Omega_2 t) & \sin(2\Omega_2 t) & 2\sin(\Omega_2 t) \\ \sin(2\Omega_2 t) & 1 - \cos(2\Omega_2 t) & -2\cos(\Omega_2 t) \\ -2\sin(\Omega_2 t) & 2\cos(\Omega_2 t) & 0 \end{bmatrix}. \tag{19}$$

The overall transformation of polarization modulator 101 is then given by $$M = M_4 \cdot M_3 = \tag{19}$$

$$\frac{1}{2} \begin{bmatrix} \cos(2\Omega_1 t) + \cos(2\Delta\Omega t) & \sin(2\Delta\Omega t) - \sin(2\Omega_1 t) & 2\sin(\Omega_2 t) \\ \sin(2\Delta\Omega t) + \sin(2\Omega_1 t) & -\cos(2\Omega_1 t) + \cos(2\Delta\Omega t) & 2\cos(\Omega_2 t) \\ 2\sin(2\Omega_1 t - \Omega_2 t) & -2\cos(2\Omega_1 t - \Omega_2 t) & 0 \end{bmatrix},$$

where $\Delta\Omega = (\Omega_2 - \Omega_1)$.

Again, the time-averaged elements of $\underline{M}$ vanish if $\Omega_1 \neq \Omega_2$, i.e., if the half-wave and quarter-wave plates spin at different angular speeds. Preferably, the two modulation frequencies are chosen such that $\Omega_1 = 1.5\Omega_2$, with $\Omega_2$ substantially larger than $2\pi/t_s$, where the half-wave plate spins at 1.5 times the speed of the quarter-wave plate. Another preferred operation of modulator 101 is when $\Omega_1 = -\Omega_2$, where the two wave plates spin in opposite directions, but at the same angular speed. It is also possible to set $\Omega_1 = 2\Omega_2$ if desired.

In all three cases the time-averaged Stokes parameters $s_1$, $s_2$, and $s_3$ of the output polarization of modulator 101 vanish for any arbitrary input polarization state if averaged over a full period of the lower of the two modulation frequencies. Again, to reduce the effects of polarization-dependent loss, the modulation frequencies $\Omega_1$ and $\Omega_2$ are selected to be integer multiples of the clock frequency of optical information signal 102.

The above-described arrangements are, of course, merely illustrative of the application of the principles of the invention. Other arrangements may be devised by those skilled in the art without departing from the spirit or scope of the invention. Specifically, it is possible to replace either one of the two sections of modulator 101 of FIG. 2 by an element that produces variable circular birefringence, such as a Faraday rotator, to produce a suitable modulation sequence in the polarization state of signal 103. Likewise, it is feasible to replace the rotating half-wave and quarter-wave plate sections of modulator 101 in FIG. 3 by generalized wave plate sections, producing variable elliptical birefringence of constant phase retardation $\pi$ and $\pi/2$, respectively. It should further be understood that the sequence of the two cascaded sections of modulator 101 may be reversed in the embodiments of FIGS. 2 and 3 without affecting the operation of modulator 101. It is also possible to combine either one of the two sections of modulator 101 shown in FIG. 2 with the half-wave plate section of modulator 101 shown in FIG. 3.

Additionally, modulator 101 may comprise three (3) or more cascaded modulator sections operated at substantially different modulation frequencies such that each of the sections produces a different modulation sequence of polarization states than the previous section in the cascade. For example, the two sections of polarization modulator 101 of FIG. 2 may be followed or preceded by a rotating half-wave plate section similar to that of FIG. 3, which is rotated at an angular speed of, for example, $\Omega_3 = 3\Omega_1$ or $\Omega_3 = 3\Omega_2$.

It should further be understood by those skilled in the art that although a titanium-indiffused waveguide structure for a lithium niobate modulator is the preferred design, other waveguide formations are contemplated and other substrates may be employed including but not limited to semiconductor materials and lithium tantalate, for example. Although not specifically shown, it is to be understood that the modulated optical signal 103 is typically launched from the modulator 101 to the optical transmission system 104 via an amplification stage or the like.

I claim:

1. Apparatus intended for use in reducing the effects of polarization dependent hole-burning in an optical transmission system employing optical fiber amplifiers, the apparatus comprising:

means for generating an arbitrarily polarized optical signal;

means for modulating the state of polarization of said arbitrarily polarized optical signal periodically through a predetermined sequence of polarization states such that averaged over a predetermined modulation period substantially all possible output polarization states are excited with substantially equal probability, said means for modulating including first means for modulating the state of polarization of a particularly polarized optical signal periodically between first and second states of polarization in at least one pair of orthogonal polarization states such that substantially equal time is spent in each of the first and second states of polarization and second means for modulating the state of polarization of a particularly polarized optical signal periodically between first and second states of polarization, where said state of polarization of the optical signal is a symmetric combination of the input state of polarization of said first means for modulating and its orthogonal polarization state, and means for supplying said polarized optical signal to said means for modulating.

2. The apparatus as defined in claim 1 where said state of polarization of said arbitrarily polarized optical signal is modulated such that the averaged values of the three Stokes parameters $s_1$, $s_2$ and $s_3$ of said sequence of polarization states are substantially zero (0).

3. The apparatus as defined in claim 1 further including means for launching said modulated optical signal as an output and wherein said first and second means for modulating include waveguide means having an electrooptically induced birefringence at a desired wavelength of operation and means for varying the orientation of linear birefringence of the waveguide and for introducing a predetermined phase retardation between said first and second orthogonal states of polarization of the optical signal wherein the predetermined phase retardation for said first means for modulating is substantially equal to $\pi$ radians when at least one of the states of polarization is substantially parallel to at least one of the principle axes of the linear birefringence, and wherein the predetermined phase retardation for said second means for modulating is substantially equal to $\pi/2$ radians when at least one of the states of polarization is substantially parallel to at least one of the principle axes of the linear birefringence.

4. The apparatus as defined in claim 3 wherein said means for varying the orientation of said first and second means for modulating includes means for continuously rotating the orientation of the linear birefringence of the waveguide at constant but substantially different speeds.

5. The apparatus as defined in claim 3 wherein the orientations of the linear birefringence of said first and second means for modulating rotate substantially at the same angular speed but in opposite directions.

6. The apparatus as defined in claim 3 wherein the orientation of the linear birefringence of said first means for modulating rotates in the same direction as the orientation of the linear birefringence of said second means for modulating at substantially one and a half times the speed of rotation of said second means for modulating.

7. The apparatus as defined in claim 3 wherein the orientation of the linear birefringence of said first means for modulating rotates in the same direction as the orientation of the linear birefringence of said second means for modulating at substantially twice the speed of rotation of said second means for modulating.

8. The apparatus as defined in claim 1 wherein said first and second means for modulating include waveguide means having an electrooptically induced birefringence at a desired wavelength of operation and means for controllably varying a phase retardation between said first and second orthogonal states of polarization of the optical signal wherein the induced birefringence of the waveguide for said first and second means for modulating is at predetermined orientations.

9. The apparatus as defined in claim 8 wherein the induced birefringence of the waveguide for each of said first and second means for modulating is linear.

10. The apparatus as defined in claim 9 wherein the linear birefringence of said second means for modulating is substantially oriented at 45° relative to the orientation of the linear birefringence of said first means for modulating.

11. The apparatus as defined in claim 8 wherein said phase retardation of said first and second means for modulating is controlled to vary periodically between predetermined positive and negative values.

12. The apparatus as defined in claim 11 wherein the predetermined positive and negative values are $0.7655\pi$ and $-0.7655\pi$, respectively.

13. The apparatus as defined in claim 11 wherein the predetermined positive and negative values are $\pi$ and $-\pi$, respectively.

14. The apparatus as defined in claim 11 wherein said means for varying the phase retardation includes means for varying said phase retardation linearly between said predetermined positive and negative values.

15. The apparatus as defined in claim 11 wherein said means for varying the phase retardation includes means for varying said phase retardation sinusoidally between said predetermined positive and negative values.

16. The apparatus as defined in claim 11 wherein the phase retardation of the induced birefringence for said first and second means for modulating is controlled at substantially different predetermined frequencies.

17. The apparatus as defined in claim 16 wherein the ratio of the predetermined frequencies for said first and second means for modulating is substantially equal to 2.

18. A method intended for use in reducing the effects of polarization dependent hole-burning in an optical transmission system employing optical fiber amplifiers, the method comprising the steps of:
generating an arbitrarily polarized optical signal;
launching said polarized optical signal; and
modulating the state of polarization of said arbitrarily polarized optical signal periodically through a predetermined sequence of polarization states such that averaged over a predetermined modulation period substantially all possible output polarization states are excited with substantially equal probability, said step of modulating including a first step of modulating the state of polarization of a particularly polarized optical signal periodically between first and second states of polarization, and a second step of modulating the state of polarization of a particularly polarized optical signal periodically between first and second states of polarization, where said state of polarization of the optical signal is a symmetric combination of an input state of polarization of said first step of modulating and its orthogonal polarization state.

19. The method as defined in claim 18 where said state of polarization of said arbitrarily polarized optical signal is modulated such that the averaged values of the three Stokes parameters $s_1$, $s_2$ and $s_3$ of said sequence of polarization states are substantially zero (0).

20. The method as defined in claim 18 further including the step of launching said modulated optical signal as an output and wherein said step of modulating includes the steps of electrooptically inducing birefringence at a desired wavelength of operation in a waveguide, varying the orientation of linear birefringence of the waveguide and introducing a predetermined phase retardation between said first and second orthogonal states of polarization of the optical signal wherein the predetermined phase retardation for said first step of modulating is substantially equal to $\pi$ radians when at least one of the states of polarization is substantially parallel to at least one of the principle axes of the linear birefringence, and wherein the predetermined phase retardation for said second step of modulating is substantially equal to $\pi/2$ radians when at least one of the states of polarization is substantially parallel to at least one of the principle axes of the linear birefringence.

21. The method as defined in claim 20 wherein said step of varying orientation of said first and second steps of modulating includes the step of continuously rotating the orientation of the linear birefringence of the waveguide at constant but substantially different speeds.

22. The method as defined in claim 20 wherein the orientations of the linear birefringence of said first and second steps of modulating rotate substantially at the same angular speed but in opposite directions.

23. The apparatus as defined in claim 20 wherein the orientation of the linear birefringence of said first step of modulating rotates in the same direction as the orientation of the linear birefringence of said second step of modulating at substantially one and a half times the speed of rotation of said second step of modulating.

24. The method as defined in claim 20 wherein the orientation of the linear birefringence of said first step of modulating rotates in the same direction as the orientation of the linear birefringence of said second step of modulating at substantially twice the speed of rotation of said second step of modulating.

25. The method as defined in claim 18 wherein said first and second steps of modulating are effected by a waveguide having an electrooptically induced birefringence at a desired wavelength of operation and include controllably varying a phase retardation between said first and second orthogonal states of polarization of the optical signal wherein the induced birefringence of the waveguide for said first and second steps of modulating is at predetermined orientations.

26. The method as defined in claim 25 wherein the induced birefringence of the waveguide for each of said first and second steps of modulating is linear.

27. The method as defined in claim 26 wherein the linear birefringence of said second step of modulating is substantially oriented at 45° relative to the orientation of the linear birefringence of said first step of modulating.

28. The method as defined in claim 26 wherein said phase retardation of said first and second steps of modulating is controlled to vary periodically between predetermined positive and negative values.

29. The method as defined in claim 28 wherein the predetermined positive and negative values are $0.7655\pi$ and $-0.7655\pi$, respectively.

30. The method as defined in claim 28 wherein the predetermined positive and negative values are $\pi$ and $-\pi$, respectively.

31. The method as defined in claim 28 wherein said step of varying the phase retardation includes a step of varying said phase retardation linearly between said predetermined positive and negative values.

32. The method as defined in claim 28 wherein said step of varying the phase retardation includes a step of varying said phase retardation sinusoidally between said predetermined positive and negative values.

33. The method as defined in claim 28 wherein the phase retardation of the induced birefringence for said first and second steps of modulating is controlled at substantially different predetermined frequencies.

34. The method as defined in claim 33 wherein the ratio of the predetermined frequencies for said first and second steps of modulating is substantially equal to 2.

* * * * *